United States Patent [19]

Furukawa

[11] Patent Number: 5,317,495
[45] Date of Patent: May 31, 1994

[54] STABILIZED HIGH VOLTAGE POWER SUPPLY CIRCUIT

[76] Inventor: Toshihiko Furukawa, Tsukimino Village, B-1-904, No. 4-5-1, Tsukimino, Yamato-shi, Kanagawa, Japan, 242

[21] Appl. No.: 974,597
[22] PCT Filed: Jun. 26, 1991
[86] PCT No.: PCT/JP91/00856
    § 371 Date: Apr. 26, 1993
    § 102(e) Date: Apr. 26, 1993
[87] PCT Pub. No.: WO93/00765
    PCT Pub. Date: Jan. 7, 1993
[51] Int. Cl.⁵ .................... H02M 3/335; H01J 29/70
[52] U.S. Cl. ........................................ 363/21; 315/411
[58] Field of Search ............ 363/21, 97; 358/190; 315/411

[56] References Cited

U.S. PATENT DOCUMENTS

| 4,531,181 | 7/1985 | Herz et al. | 363/21 |
|---|---|---|---|
| 4,561,047 | 12/1985 | DePuy | 363/21 |
| 4,885,509 | 12/1989 | Ikevchi | 315/411 |
| 5,019,953 | 5/1991 | Kawaberi et al. | 315/411 |
| 5,049,792 | 9/1991 | Oh | 315/411 |
| 5,189,599 | 2/1993 | Messman | 363/21 |

FOREIGN PATENT DOCUMENTS

| 5176012 | 7/1976 | Japan | 363/21 |
|---|---|---|---|
| 55-93374 | 7/1980 | Japan | 363/21 |
| 62-109475 | 5/1987 | Japan | 363/21 |
| 1200877 | 8/1989 | Japan | 363/21 |
| 36175 | 1/1991 | Japan | 363/21 |

Primary Examiner—Steven L. Stephan
Assistant Examiner—Matthew Nguyen
Attorney, Agent, or Firm—Young & Thompson

[57] ABSTRACT

A stabilized high voltage power supply circuit in a cathode-ray-tube using electromagnetic deflection. A secondary side of a transformer for controlling high voltage is connected with and arranged at a primary side of a flyback transformer. Further a controlling circuit is connected with and arranged at the primary side of the transformer for controlling high voltage. The controlling circuit comprises an operational amplifier for outputting direct current in accordance with a voltage difference between a predetermined reference voltage and a feedback voltage in a high voltage output, a first transistor for base-inputting rectangular wave forms generated at a primary side in a transformer for controlling high voltage and connecting an output of said operational amplifier with an emitter and a second transistor for controlling a primary coil current in said transformer for controlling high voltage in accordance with ON/OFF in the first transistor. The controlling circuit serves to control a peak value of a pulse which is generated at the secondary side in the transformer for controlling high voltage due to controlling the primary coil current in the transformer for controlling high voltage in accordance with a variation of the high voltage output. The controlled pulse is so overwrapped that a high voltage output level is maintained at constant in the primary side of the flyback transformer, thereby a stabilization of high voltage output is achieved.

1 Claim, 9 Drawing Sheets

STABILIZED HIGH VOLTAGE POWER SUPPLY CIRCUIT

TECHNICAL FIELD

This invention relates to a stabilized high voltage power supply circuit in a cathode-ray-tube (hereinafter referred to CRT), and more particularly to a stabilized high voltage power supply circuit which has high speed response and is operatable with low power consumption.

BACKGROUND OF THE ART

As a beam current in the color CRT is several times larger, as compared with the monotone CRT, a large variation of average beam current depends on screens. This large variation makes a voltage regulation be lower, thereby a variation of a horizontal amplitude and a deterioration of a focus and convergence are caused to affect an operation of the CRT. To combat these problems, various stabilized high voltage power supply circuits have been conventionally produced, in which stabilization of high voltage is achieved even when the average beam current has a variation.

Figure 7:
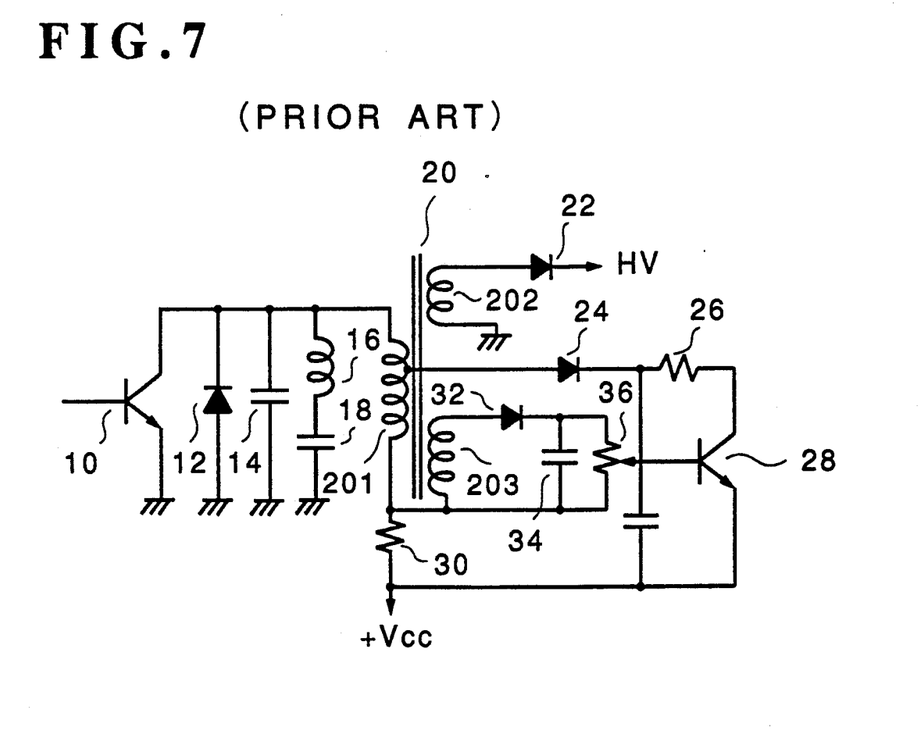
FIG. 7 is a conventional circuit diagram showing the stabilized high voltage power supply circuit using the transistor for controlling a high voltage.

FIG. 7 shows a stabilized high voltage power supply circuit using a transistor for controlling high voltage, in which a reference number 10 depicts a horizontal output transistor, 12 a damper diode, 14 a resonance capacitor, 16 a deflecting coil, 18 a capacitor preventing direct current. These elements define a normal horizontal output circuit so as to obtain a high voltage output through a diode 22 connected to a secondary coil 202 in a flyback transformer 20. A primary coil 201 is connected at its intermediate tap to a collector of a transistor for controlling high voltage in the secondary side through a diode 24 and a resistance 26. The transistor 28 for controlling high voltage is connected at its emitter with the primary coil 201 and a secondary coil 203 through a resistance 30 and further with a supply voltage Vcc. The secondary coil 203 is so connected at its opposite ends with a series circuit comprising a diode 32 and a capacitor 34 as to be parallel to the series circuit. The capacitor 34 is so connected with a variable resistance 36 as to be parallel to the variable resistance 36. The variable transistor 36 is connected with the transistor 28 for controlling high voltage at its base.

In such the stabilized high voltage power supply circuit shown in FIG. 7, a pulse voltage is so rectified through the diode 24 as to be a direct positive voltage. The direct positive voltage is applied to the transistor 28 for controlling high voltage at its collector through the resistance 26 and further a pulse voltage in the secondary coil 203 is so rectified through a diode 32 as to be a direct voltage. The direct voltage is applied to the transistor 28 for controlling high voltage at its base through the variable resistance 36, thereby the transistor 28 for controlling high voltage is so biased into a forward direction as to remain a collector voltage at a flowing state and is used. Accordingly, one part of a deflecting output is used at the resistance 26 and the transistor 28 for controlling a high voltage. At the same time, a voltage reduction at the resistance 30 by the collector voltage of the horizontal output transistor 10 is applied to the base of the transistor for controlling high voltage and further serves to cancel a rectified voltage in the diode 32. When the collector current in the horizontal output transistor 10 is increased due to an increase of a high voltage current, the voltage reduction in the resistance 30 is also increased. As a result of that, a base voltage in the transistor 28 for controlling high voltage is lowered, so that the collector voltage in the transistor 28 for controlling high voltage is decreased. Therefore, loss in a controlling circuit is so decreased as to increase a high voltage, so that a high voltage output level is maintained at constant.

Figure 8:
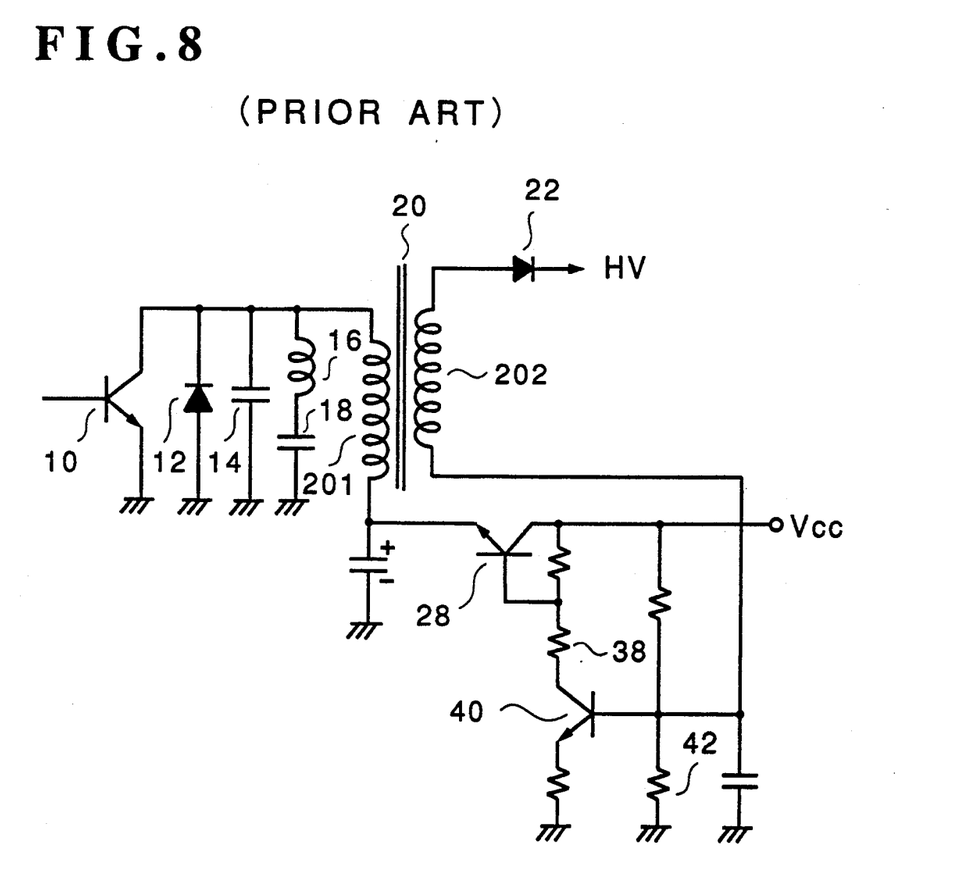
FIG. 8 is a conventional circuit diagram showing the stabilized high voltage power supply circuit in the system for controlling the power supply.

Referring to FIG. 8 showing a stabilized high voltage power supply circuit in a controlling system for a power supply, the transistor 28 for controlling high voltage is so connected between a power supply Vcc and the primary coil 201 in the flyback transformer 20 as to be series thereto and a transistor 40 is connected with the transistor 28 for controlling high voltage at its base through a resistance 38. In such the stabilized high voltage power supply circuit, an anode current in the CRT is detected in a resistance 42 being connected to a fly-back line of the secondary coil 202 and is subjected to voltage-amplification at the transistor 40, thereby a voltage $V_{CE}$ between the collector and the emitter has a variation so that a supply voltage has also a practical variation to obtain a stabilization of a high voltage.

Figure 9:
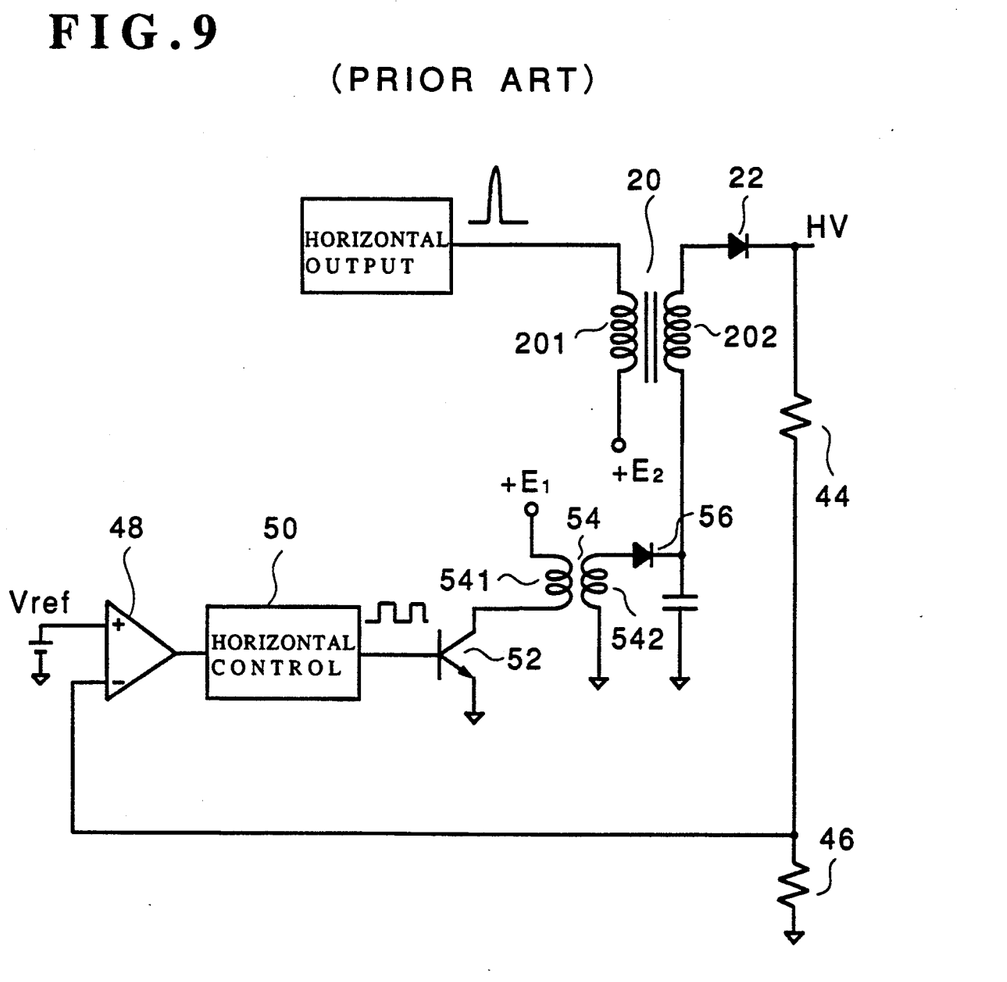
FIG. 9 is a conventional circuit diagram showing the stabilized high voltage power supply circuit using the switching control circuit.

FIG. 9 shows the stabilized high voltage power supply circuit. Voltage in a high voltage output circuit is divided by a bleeder resistance 44 and 46. An operational amplifier is supplied at its one side with the divided voltage and at its another side with a reference voltage $V_{ref}$. An output in the operational amplifier 48 is defined by a difference of voltage between the divided voltage and the reference voltage. The output voltage in the operational amplifier 48 is supplied to a circuit 50 for controlling a switching. The circuit for controlling a switching controls a switching transistor 52 being connected to a primary coil 541 in a transformer 54 for controlling high voltage, so that the switching transistor 52 is turned ON or OFF. This switching operation generates a voltage in a secondary coil 542. The generated voltage is rectified through a diode 56 and so applied to the secondary coil 202 in the flyback transformer 20 as to cancel a variation in a high voltage side, thereby a stabilization of a high voltage is achieved.

Further, in the U.S. Pat. No. 4,614,899 (by Web et al.) disclosed is a regulator for a pulse voltage generator such as flyback-type high voltage generators, in which used is a feedback circuit. In accordance with a difference between a sample of a high voltage output and a reference voltage, an additional voltage which is added to an input side of a flyback transformer as to maintain an output voltage at a desired level. In this U.S. Patent, a secondary side in an energy storage transformer is interconnected with a primary side in the flyback transformer of a power supply. Further arranged is a switching circuit for receiving a line sweep timing information by a sample of the flyback pulse from a tap point in the primary side of the flyback transformer and performing ON.OFF operation in accordance with the voltage difference.

However, in the above mentioned stabilized high voltage power supply circuits, each of the circuits shown in FIGS. 7 and 8 requires a high withstand voltage and large power transistor with high expense and large power consumption in order to obtain a constant flow of direct current for controlling high voltage. Further each of the circuits shown in FIGS. 7 and 8 limits response speed within a limitation of a series regulator due to the circuit design. In the circuit shown in FIG. 9, a response speed is higher in the switching control defined by connecting the transformer for controlling high voltage with a flyback line in the flyback transformer, but a time constant limits a response speed, since an output in the transformer for controlling high voltage is rectified through the diode and is connected with the flyback line in the flyback transformer. Further, the circuit shown in FIG. 9 requires controlling of a high voltage with a wider range from 0 to 1 KV or more, due to the connection of the output in the transformer for controlling high voltage and the flyback line of the flyback transformer. In the circuit disclosed in the U.S. Patent by Web et al., a driving of the switching transistor defining the switching circuit requires a rectangular wave generating circuit in a driving circuit, which is synchronized with a flyback, thereby these circuits are so complicated and much expensive.

Accordingly, an object of the present invention is to provide a stabilized high voltage power supply circuit in which a transistor of a relatively low voltage may be used and further a high response speed and a simple circuit design may be achieved.

DISCLOSURE OF THE INVENTION

In a stabilized high voltage power supply circuit in which a horizontal output pulse is inputted into a flyback transformer at its primary coil and a high voltage pulse generated in the flyback transformer at its secondary coil is so rectified through a diode as to obtain a high voltage output and also as to lower a variation in the high voltage output, said stabilized high voltage power supply circuit is characterized in that;

- a secondary coil in a transformer for controlling high voltage is connected with and arrange at the primary coil in said flyback transformer,
- a controlling circuit is connected with and arranged at the primary side in said transformer for controlling high voltage, so that a high voltage output level is maintained at constant,
- said controlling circuit comprises;
- an operational amplifier for outputting direct current in accordance with a voltage difference between a reference voltage and a feedback voltage in the high voltage output,
- a first transistor for base-inputting rectangular wave forms and connecting an output of said operational amplifier with an emitter in which said rectangular wave forms are automatically generated at the primary side in the transformer for controlling high voltage due to saw-toothwave current synchronizing with the horizontal output pulse flown at the secondary side in said transformer for controlling high voltage on an inductance ratio of the primary coil in the flyback transformer and a deflecting coil and
- a second transistor for controlling current flow in the primary coil in said transformer for controlling high voltage in accordance with ON.OFF in the first transistor.

In a stabilized high voltage power supply circuit according to the present invention, a controlling circuit is provided to a primary side of a transformer for controlling a high voltage with series connection and arrangement to a primary side of a flyback transformer. The controlling circuit operates a controlling of a current in accordance with a vibration of a detected voltage in a high voltage output, so that controlled is a peak value of a pulse generated in a secondary side of the transformer for controlling a high voltage. The controlling circuits controls the peak value so that a high voltage variation is controlled and further a secondary pulse in the transformer for controlling a high voltage is overwrapped on the primary side of the flyback transformer, thereby a controlling of the variation of the high voltage output may be achieved.

EMBODIMENT

Embodiments of a stabilized high voltage power supply circuit according to the present invention will hereinafter fully be described in detail with accompanying drawings.

Figure 1:
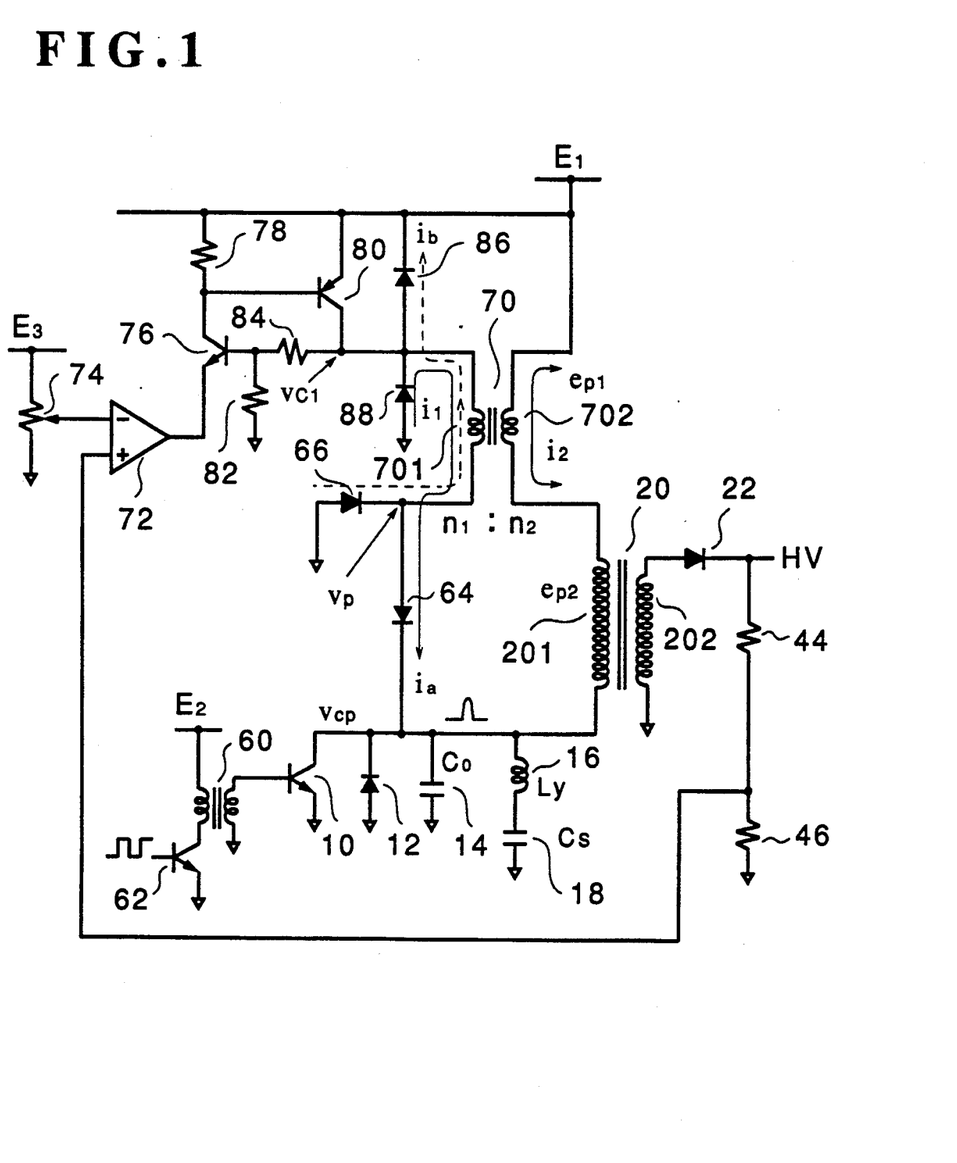
FIG. 1 is a circuit diagram showing one embodiment of a stabilized high voltage power supply circuit according to the present invention.

FIG. 1 is a circuit diagram showing one embodiment of a stabilized high voltage power supply circuit according to the present invention. In FIG. 1, each portions in the circuit has the same reference number as those illustrated in FIGS. 7 to 9. A horizontal output transistor 10 is connected at its base with a secondary coil in a transformer 60. A primary coil in the transformer 60 is connected at its one end with a power supply $E_2$ and at its another end with a horizontal driving transistor 62 at its collector. The horizontal driving transistor 62 is grounded at its emitter. The horizontal driving transistor 62 is connected at its base with a horizontal generator (not shown) at its output. As shown in FIG. 7, the horizontal driving transistor 10 is so connected at its collector with a damper diode 12, a resonance capacitor 14 and an series circuit comprising a deflecting coil 16 and a capacitor 18 preventing direct current as to be parallel thereto, thereby a horizontal output circuit is defined. Further, the horizontal output transistor 10 is connected at its collector with one end of a primary coil of a flyback transformer 20 and also with the primary coil of a transformer 70 for controlling a high voltage and a diode 66 at its cathode through a diode 64. The primary coil of the flyback transformer 20 is connected at its another end to a power supply $E_1$ through a secondary coil 702 in the transformer 70 for controlling a high voltage. A secondary coil 202 of the flyback transformer 20 is grounded at its one end. The secondary coil 202 of the flyback transformer 20 is connected at its another end with an anode of a CRT 5 (not shown) and further grounded through the resistances 44 and 46. A point in which the resistances 44 and 46 are connected with each other is connected with an operational amplifier 72 at its one input terminal. The operational amplifier 72 is connected at its another input terminal to a power supply $E_3$. The operational amplifier 72 is connected at its output terminal with an npn transistor at its emitter. The npn transistor is connected at its collector with a pnp transistor 80 at its base and further through a resistance 78 with a power supply $E_1$, the pnp transistor 80 at its emitter and a diode 86 at its cathode. The npn transistor 76 is grounded at its base through a resistance 82. The npn transistor 76 is connected at its base through a resistance 84 with the pnp transistor 80 at its collector. The npn transistor 76 is also connected at its base with the diode 86 at its anode. The npn transistor 76 is also connected at its base with a diode 88 at its cathode. Further, the npn transistor 76 is also connected at its base with another end of the primary coil 701 in the transformer 70 for controlling a high voltage. The diode 88 is grounded at its anode.

Operation of the stabilized high voltage power supply circuit according to the present invention will hereinafter fully be described with referring to wave form charts illustrated in FIGS. 2 to 4.

The operational principle according to the present invention will hereinafter be described. A pulse voltage $V_{CP}$ generated in the horizontal output transistor 10 at its collector end is expressed by the following equation by use of the transient phenomena theory.

$$V_{CP} \approx \frac{E_1}{\sqrt{L_y \cdot C_0}} \cdot \frac{T}{2}$$

Providing that $C_0$ depicts amount of the resonance capacitor 14, Ly an inductance value of the deflecting coil 16, T a scanning term.

Since the primary coil 201 in the flyback transformer 20 is so connected with the deflecting coil 16 as to be parallel to the deflecting coil 16 in view of alternating current, the secondary coil current $i_2$ is flown on the basis of a ratio of an inductance value between an inductance value Ly of the deflecting coil 16 and an inductance value $L_{P1}$ of the primary coil 201 in the flyback transformer 20. Generally a relation of the inductance value Ly and the inductance value $L_{P1}$ is expressed by the following equation.

$$Ly << L_{P1}$$

A relation of the current $i_2$ and a deflecting current iy is expressed by the following equation.

$$i_2 << iy$$

Since the secondary side of the transistor 70 for controlling high voltage has constant current flow indicated as $i_2$ in FIG. 1, when the pnp transistor 80 is completely turned into an OFF state, rectangular voltage wave forms are generated at the collector of the pnp transistor 80 on the basis of the following theoretical equation in the electromagnetism. The rectangular voltage wave forms are indicated as $V_{CI}$ in FIG. 2.

$$e = -L \cdot di/dt$$

Each of the diodes 64, 66, 86 and 88 is connected, thereby formed is a path for a positive current and a negative current of the primary coil current $i_1$ in the transistor 70 for controlling a high voltage. A difference between the primary coil $i_1$ and the secondary coil $i_2$ in the transistor 70 for controlling a high voltage is only a difference of a peak value. Each current value of The primary coil $i_1$ and the secondary coil $i_2$ is obtained on the basis of a winding ratio $n_2/n_1$ in the transistor 70 for controlling a high voltage. Accordingly the primary coil current $i_1$ is expressed by the following equation.

$$i_1 = (n_2/n_1) \cdot i_2$$

In the stabilized high voltage power supply circuit shown in FIG. 1, a direct voltage is so applied to the npn transistor 76 at its emitter as to control a collector current in the npn transistor 76, thereby a base voltage in the pnp transistor 80 is so controlled that partially controlled is a current $i_a$ flown in the collector of the pnp transistor 80. As a result of that, the current $i_2$ generated at the secondary coil 702 in the transistor 70 for controlling a high voltage is overwrapped for a flyback term $T_r$, so that a high voltage output is controlled.

Figure 2:
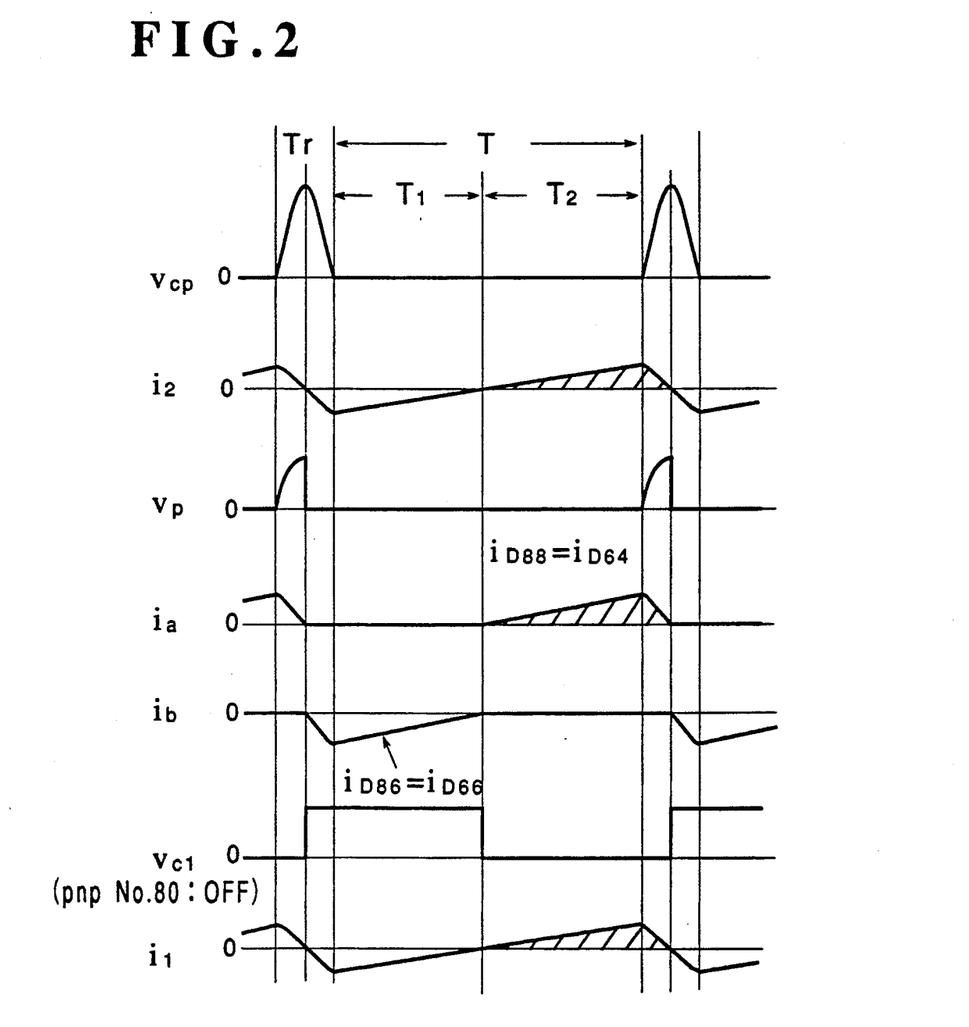
FIG. 2 is a wave form chart of a voltage and a current for description of operation of a stabilized high voltage power supply circuit according to the present invention.

Referring to FIG. 2, a range in which the pnp transistor 80 may control the high voltage output of is only a range indicated as a $T_2$ in a scanning term T. Since current has a negative state in a range indicated as a $T_1$, the range indicated as a $T_1$ is not included in the range in which the pnp transistor 80 may control the high voltage output. The npn transistor 76 is applied at its base with the voltage $V_{C1}$ divided by the resistance 82 and 84, thereby the transistor 76 is subjected to a switching operation in a rectangular wave voltage, which corresponds to the voltage $V_{C1}$, so that the pnp transistor 80 is driven.

The controlling process will hereinafter fully be described by use of wave forms. When a lord of the high voltage output is increased and an output voltage HV of a high voltage is lowered, a variation of the output voltage HV of a high voltage is detected in the resistance 46 and further subjected to feedback to the operational amplifier 72 at its one input terminal. In accordance with a difference between the variation of the output voltage HV and a reference value which is predetermined in a variable resistance 74 connected to the operational amplifier 72 at its another of the input terminal, an output of the operational amplifier 72 is lowered. Accordingly the collector current of the npn transistor 76 has larger flow by such an amount that the emitter voltage of the npn transistor 76 is lowered or a voltage between the base and the emitter is increased, thereby the base voltage of the pnp transistor 80 is lowered. As a result of that, the collector current $i_{C1}$ of the pnp transistor 80 is flown, thereby a duty of the $V_{C1}$ has a variation. Therefore, $T_1$ term is wider by $\Delta T$ term in the scanning term T. In $\Delta T$ term in the scanning term T, the npn transistor 76 remains in a ON state, so that current is flown in accordance with the following equation.

$$i = (E_1/L_1) \cdot t$$

Providing that $L_1$ depicts an inductance of the primary coil 701 in the transformer 70 for controlling high voltage. A current $i_{D86}$ ($=_{D66}$) has a decreased flow, corresponding to current increase in the $\Delta T$ term. A peak value of a current $i_{D88}$ is increased by amount of decrease of the current $i_{D86}$. Consequently, current $i_{D64}$ flown in the diode 64 is expressed by the following equation.

$$i_{D64} = i_{C1} + i_{D88}$$

When the pnp transistor 80 is turned into a OFF state, the current $i_{D64}$ is expressed by the following equation.

$$i_{D64} = i_{D88}$$

When the pnp transistor 80 is turned into a ON state, $i_{C1}$ is flown in accordance with the following equation.

$$i = (E_1/L_1) \cdot t$$

The current expressed by the above equation $i_{D64} = i_{C1} + i_{D88}$ is flown to the horizontal output circuit through the diode 64.

Although the current $i_{D64}$ flown in the diode 64 is expressed by the following equation, it is possible that each of two currents has a different gradient.

$$i_{D64} = i_{C1} + i_{D88}$$

Because a gradient of the collector current $i_{c1}$ is expressed by the following equation $$E_1/L_1$$

and a gradient of the current $i_{D88}$ flown in the diode 88 is similar to the secondary side of the transistor 70 for controlling high voltage.

Figure 3:
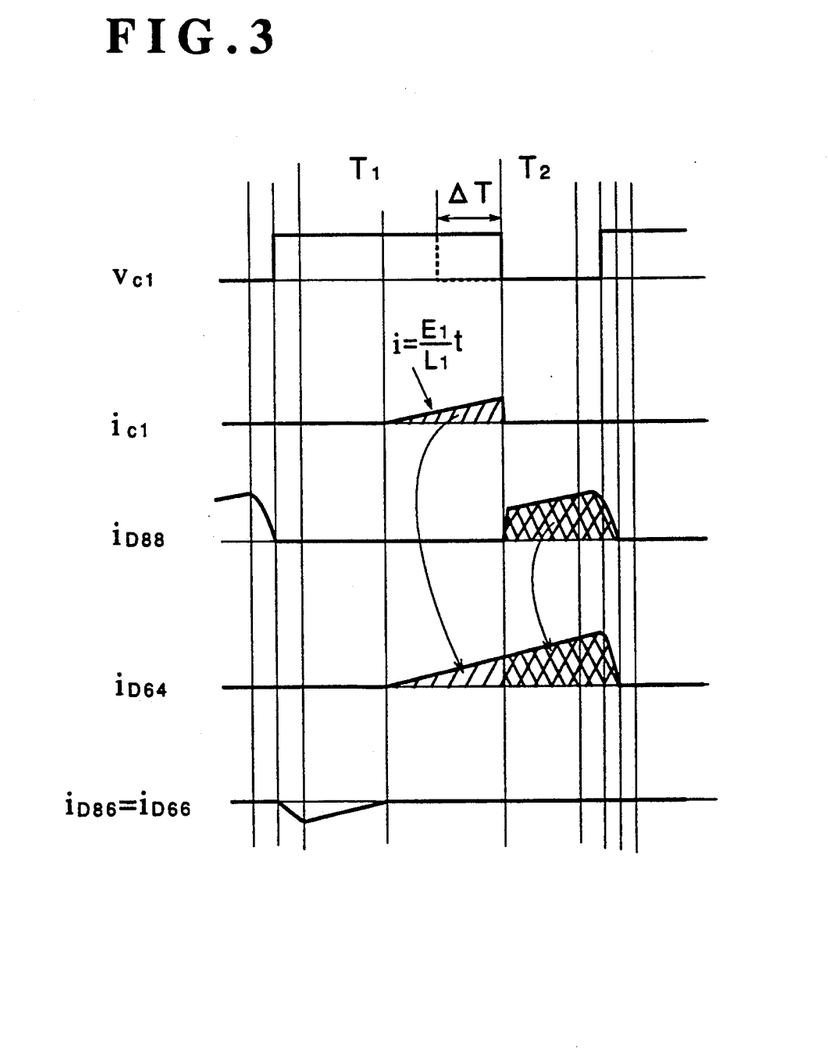
FIG. 3 is a wave form chart of a voltage and a current in a primary circuit of a stabilized high voltage power supply circuit according to the present invention.

As understood in FIG. 3, the collector current $i_{C1}$ of the pnp transistor 80 is increased, thereby a negative peak value of the $i_{D86}$ ($=i_{D66}$) flown in the diodes 86 and 66 is decreased by amount of increasing of the collector current $i_{C1}$, so that a positive peak value of the iD64 is increased. In view of a DC, the collector current $i_{C1}$ become a form moved in a positive direction. Accordingly a peak value of the saw-tooth-wave current $i_1$ ($=(n_2/n_1) \cdot i_2$) flown in the primary coil 701 of the transformer 70 remains at constant.

Figure 4:
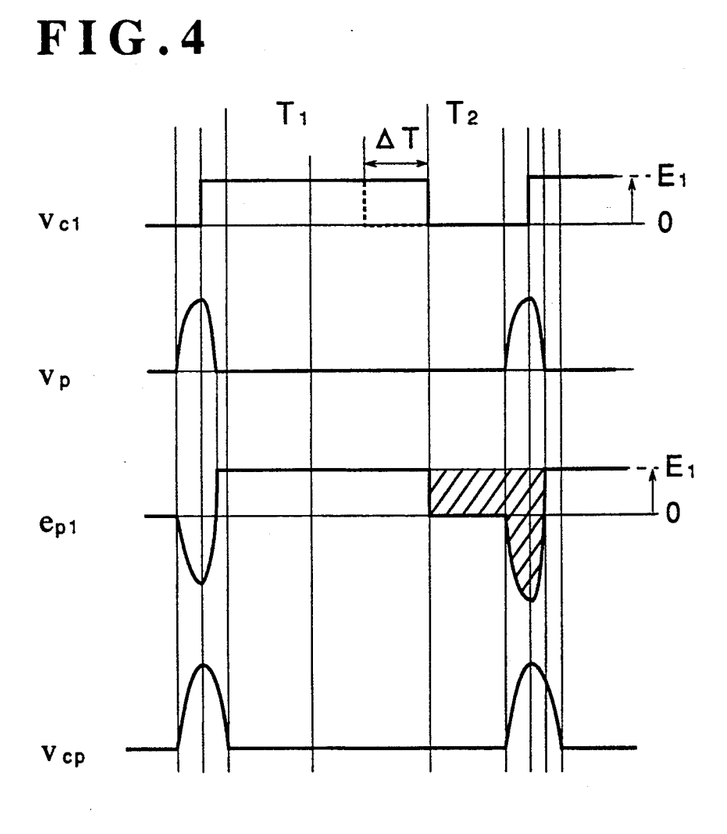
FIG. 4 is a wave form chart of a voltage in a secondary circuit of a stabilized high voltage power supply circuit according to the present invention.

FIG. 4 is a view showing voltage wave forms of the voltage of the secondary side in the transistor 70 for controlling high voltage. In FIG. 4, although the current $i_{D64}$ flown in the diode 64 is maintained in a OFF state in the flyback term $T_r$ and maintained in a ON state in the scanning term $T$ ($=T_1+T_2$), the positive current $i_{D64}$ in the flyback term $T_r$ is flown through the diode 64, thereby the diode 64 is maintained in a ON state for the flyback term $T_r$. Accordingly generated is a pulse $v_p$ which has such a pulse width as half of the pulse width of the pulse voltage $v_{cp}$ generated in the horizontal output transistor 10 at its collector.

Figure 5:
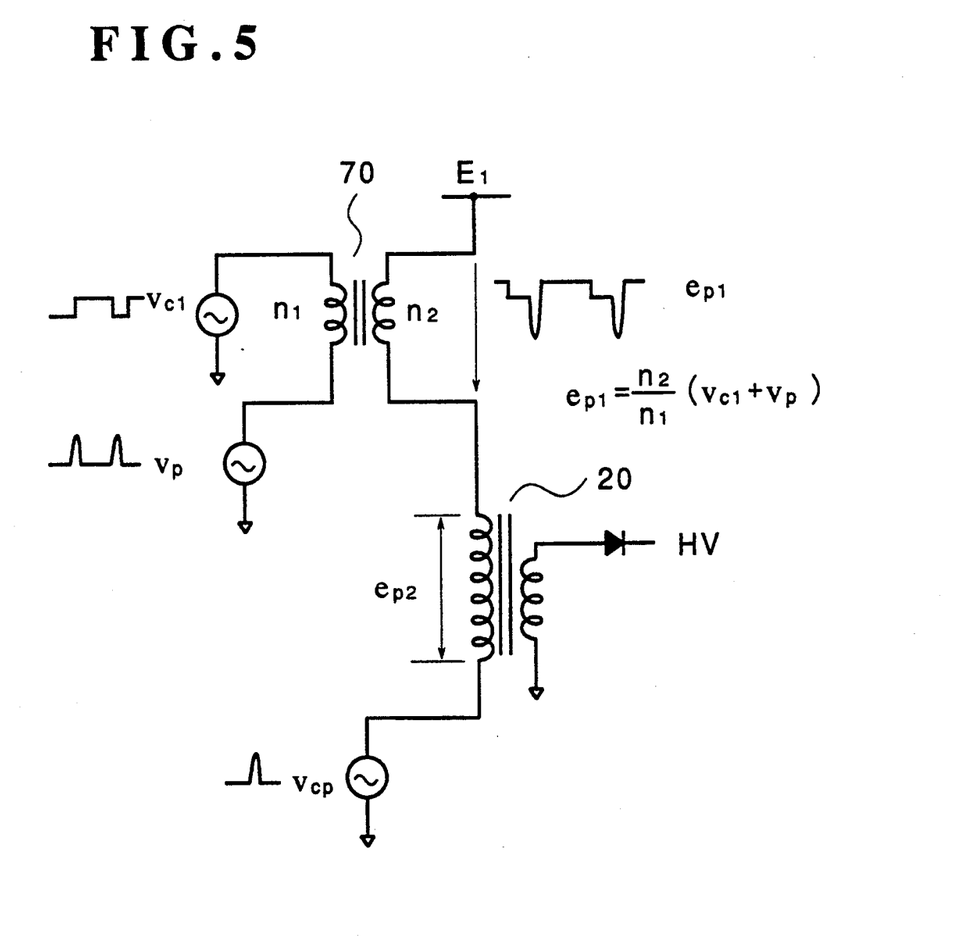
FIG. 5 is a view schematically showing a wave form of each of an input and an output in a transformer for controlling a high voltage and a flyback transformer according to the present invention.

The reason that a voltage pulse $e_{p1}$ is generated in the secondary coil 702 in the transformer 70 for controlling high voltage as shown in FIG. 4 will hereinafter fully be described with referring to FIG. 5. In the voltage wave forms $v_{C1}$ and $v_p$ respectively inputted to opposite ends of the primary coil 701 of the transistor 70 for controlling high voltage which has a winding ratio of $n_1:n_2$, the voltage wave forms $v_p$ are subjected to polarity inversion through the transistor 70 for controlling high voltage and are appeared in the secondary coil 702. Therefore, a mixed output of the $v_{C1}$ and the $v_p$, which is outputted in the secondary coil 702, is expressed by the following equation, which is shown in FIG. 5.

$$e_{p1} = (n_2/n_1) \cdot (v_{C1} + v_p)$$

An area of oblique portion in the wave forms $e_{p1}$ shown in FIG. 4 is maintained at constant, thereby when a duty ratio of the voltage $v_{cp}$ in the collector of the horizontal output transistor 10 has variation, an increase and decrease of a duty ratio of the $e_{p1}$ is expressed by an increase and decrease of a peak value of the $e_{p1}$.

The voltage pulse $e_{p1}$ generated in the transistor 70 for controlling high voltage at its secondary coil 702 is supplied to the primary coil 201 at its one end in the flyback transformer 20. The horizontal output pulse $v_{cp}$ is supplied to the primary coil 201 at its another end in the flyback transformer 20. Since the $e_{p1}$ has a negative polarity in relation to the $v_{cp}$, the mixed voltage pulse $e_{p2}$ at the primary coil 201 in the flyback transformer 20 is expressed by the following equation.

$$e_{p2} = v_{cp} - (-e_{p1}) = v_{cp} + e_{p1}$$

When the horizontal output pulse $v_{cp}$ is maintained at constant and a voltage in the high voltage output HV is lowered due to increasing of a lord in the high voltage output, the voltage pulse $e_{p1}$ in the secondary coil 702 of the transistor 70 for controlling high voltage has an increased peak value, thereby the mixed voltage pulse $e_{p2}$ in the primary coil 201 of the flyback transformer 20 has such an increased peak value that a voltage in the high voltage output HV is higher. Further, when the voltage in the high voltage output HV is higher, the voltage pulse $e_{p1}$ has such a decreased peak value that the voltage in the high voltage output HV is lowered. As a result of that, a stabilized high voltage power supply circuit may be obtained.

Figure 6:
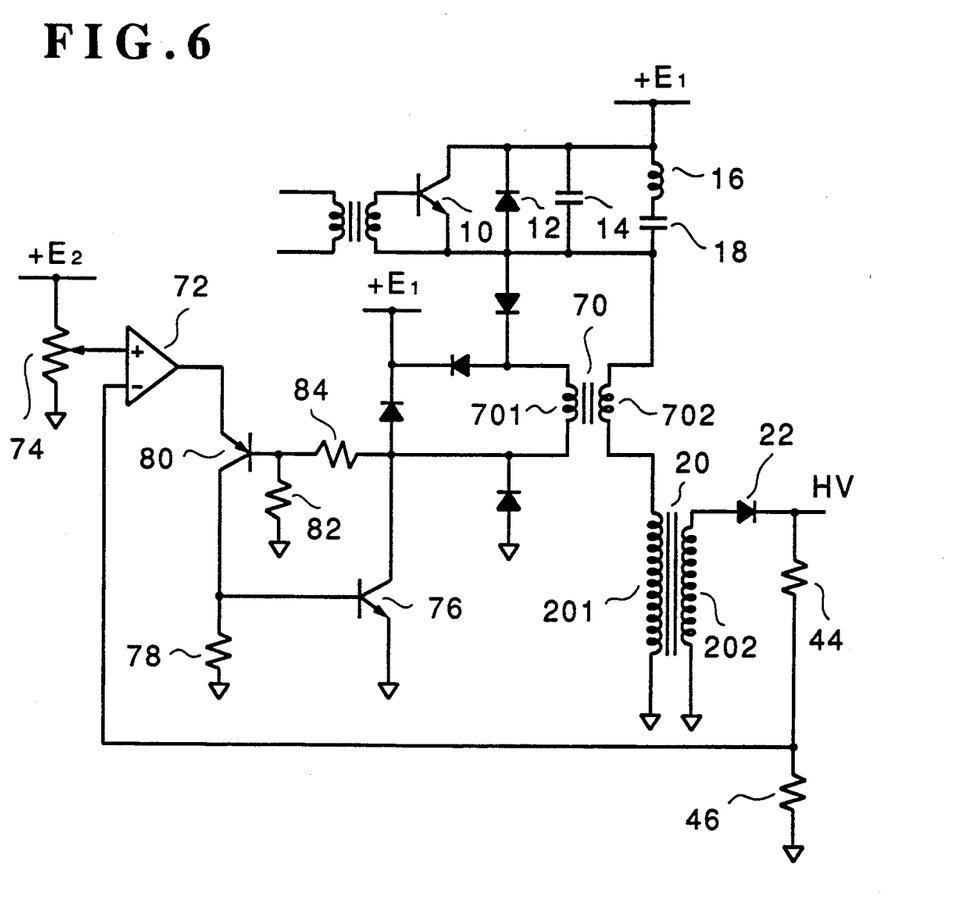
FIG. 6 is a circuit diagram showing another embodiment of a stabilized high voltage power supply circuit according to the present invention.

FIG. 6 shows another embodiment of a stabilized high voltage power supply circuit according to the present invention. In FIG. 1, each portions in the circuit has the same reference number as those illustrated in FIG. 6. In this embodiment, for example, when a voltage in the high voltage output HV is increased, the voltage increase is detected through the detecting circuit 46. The voltage value is subjected to feedback to the operational amplifier 72 at its one input terminal. A reference value is predetermined through the variable resistance 74 and inputted into the operational transistor 72 at its another input terminal. An output of the operational amplifier 72 is lowered in accordance with a difference between the reference value and the voltage value subjected to feedback. Accordingly, the base voltage of the npn transistor 76 is lowered by amount of decrease of the emitter voltage of the pnp transistor 80 or a decrease of the voltage between the base and the emitter, thereby the collector current of the npn transistor 76 is decreased. As a result of that, the peak value of the pulse voltage $e_{p1}$ generated at the secondary coil in the transistor 70 for controlling high voltage is lowered and further the peak value of the mixed voltage pulse $e_{p2}$ at the primary coil 201 of the flyback transformer 20 is also lowered so that the voltage of the high voltage output HV is so lowered as to be stabilized.

As obviously understood in the above embodiments according to the present invention, the transformer for controlling high voltage is provided at its primary side with the controlling circuit which control a peak value of a pulse generated at the secondary side of the transformer for controlling high voltage. The pulse whose peak value is controlled is overwrapped at the primary side of the flyback transformer with the horizontal pulse. As a result of that, a high voltage output at the secondary side in the flyback transformer is so controlled as to be constant. In such the construction, not required is a predetermined direct current which is required in the circuit shown in FIGS. 7 and 8, thereby a power consumption is smaller. Further, a response speed is higher due to a control of a switching operation. As compared with the circuit shown in FIG. 9, since a variation of the peak value in the transformer for controlling high voltage is 1/n (providing that n depicts a winding ratio in the flyback transformer), not required is a controlling operation of high voltage with wider range from 0 to 1 KV or more, although the operation is required in the circuit shown in FIG. 9. This permits a designation of the transformer for controlling high voltage to be more convenient. Further, since employed is a rectangular wave generated automatically at the primary side by saw-tooth-wave flown in the secondary side in the transformer for controlling high voltage, a circuit for inputting signals to the transistor serves to control a pulse width, although in the conventional stabilized high voltage power supply circuit by Web et al. used is a wave forms generating circuit which is defined by combination with synchronizing signals which are fetched from the primary tap in the flyback transformer by use of alternative circuits such as controlling IC generally used in the switching regulators, such the wave forms is not required in the stabilized high voltage power supply circuit according to the present invention. Accordingly a simple stabilized high voltage power supply power circuit may be obtained with lower construction cost.

Whereas the preferred embodiments of the present invention was described, the present invention is by no means intended to be limited by the above embodiments. Accordingly it is no doubt acceptable to make various modifications of the invention falling within the spirit and scope of the invention.

I claim:

1. A stabilized high voltage power supply circuit in which a horizontal output pulse is inputted into a flyback transformer at its primary coil and a high voltage pulse generated in the flyback transformer at its secondary coil is so rectified through a diode as to obtain a high voltage output and also as to lower a variation in the high voltage output, characterized in that:

a secondary coil in a controlling transformer for controlling high voltage is connected with and arranged at the primary coil in said flyback transformer, a controlling circuit is connected with and arranged at a primary side in said controlling transformer, so that a high voltage output level is maintained constant, said controlling circuit comprises:

an operational amplifier for outputting a direct current in accordance with a voltage difference between a reference voltage and a feedback voltage in the high voltage output, a first transistor for base-inputting rectangular wave forms and connecting an output of said operational amplifier with an emitter, said rectangular wave forms being automatically generated at the primary side in the controlling transformer due to saw-tooth-wave current synchronizing with the horizontal output pulse flowing at the secondary side in said controlling transformer on an inductance ratio of the primary coil in the flyback transformer and a deflecting coil and a second transistor for controlling current flowing in the primary coil in said controlling transformer in accordance with ON/OFF in the first transistor.

* * * * *